(12) United States Patent
Green et al.

(10) Patent No.: US 10,763,651 B2
(45) Date of Patent: Sep. 1, 2020

(54) CABLE STRIPPING TOOL AND BI-DIRECTIONAL CUTTING BLADE

(71) Applicant: Greenlee Tools, Inc., Rockford, IL (US)

(72) Inventors: Scott Rickard Green, Rockford, IL (US); Wilbur Keith Moffatt, Freeport, IL (US)

(73) Assignee: GREENLEE TOOLS, INC., Rockford, IL (US)

( * ) Notice: Subject to any disclaimer, the term of this patent is extended or adjusted under 35 U.S.C. 154(b) by 52 days.

(21) Appl. No.: 15/241,556

(22) Filed: Aug. 19, 2016

(65) Prior Publication Data
US 2017/0054280 A1    Feb. 23, 2017

Related U.S. Application Data

(60) Provisional application No. 62/208,016, filed on Aug. 21, 2015.

(51) Int. Cl.
*H02G 1/12*    (2006.01)

(52) U.S. Cl.
CPC ......... *H02G 1/1224* (2013.01); *H02G 1/1226* (2013.01)

(58) Field of Classification Search
CPC .. H02G 1/1221; H02G 1/1224; H02G 1/1226; H02G 1/1236; H02G 1/1204; H02G 1/1229; H02G 1/1268
USPC ........... 30/90.1, 90.2, 90.4, 90.6, 90.7, 90.8, 30/91.2, 353, 356, 357
See application file for complete search history.

(56) References Cited

U.S. PATENT DOCUMENTS

| | | | | |
|---|---|---|---|---|
| 3,204,495 A | * | 9/1965 | Matthews | H02G 1/1226 30/90.1 |
| 3,686,982 A | * | 8/1972 | Bull | H02G 1/1226 30/91.2 |
| 3,820,420 A | * | 6/1974 | Matthews | H02G 1/1226 30/91.2 |
| 4,472,877 A | * | 9/1984 | Undin | H02G 1/1231 30/90.7 |
| 4,489,490 A | * | 12/1984 | Michaels | H02G 1/1229 30/90.1 |
| 5,074,043 A | * | 12/1991 | Mills | H02G 1/1221 30/90.1 |

(Continued)

FOREIGN PATENT DOCUMENTS

| | | | |
|---|---|---|---|
| FR | 2602922 | * | 2/1988 |
| GB | 1088475 | * | 10/1967 |

*Primary Examiner* — Evan H MacFarlane
(74) *Attorney, Agent, or Firm* — Klintworth & Rozenblat IP LLP

(57) ABSTRACT

A cable stripping tool is provided for making a circumferential or ring cut and a spiral cut in the jacket of a cable. A cutting blade of the tool includes first and second blade portions which are integrally formed with each other and are angled relative to each other. In use, after the cutting blade penetrates the jacket, the tool is rotated in a first direction and the first blade portion cuts the jacket to form a ring cut. The tool is then rotated in a second, opposite direction and the second blade portion cuts the jacket to form a spiral cut. Thereafter, the tool is rotated in the first direction and the first blade portion cuts the jacket to form a ring cut. The cuttings by the blade portions are done without disengaging the cutting blade from the cable.

20 Claims, 13 Drawing Sheets

(56) References Cited

U.S. PATENT DOCUMENTS 5,829,141 A * 11/1998 Pick .................. H02G 1/1231
30/90.7
6,910,275 B2   6/2005 Tapper

* cited by examiner

CABLE STRIPPING TOOL AND BI-DIRECTIONAL CUTTING BLADE

This application claims the domestic benefit of U.S. Provisional Application Ser. No. 62/208,016, filed on Aug. 21, 2015, the contents of which are incorporated herein in its entirety.

FIELD OF THE DISCLOSURE

The present disclosure relates to a cable stripping tool and bi-directional cutting blade.

BACKGROUND

Prior art cable-stripping tools have first and second parts which can rotate relative to one another about an axis and of which a first part carries a cutting blade in the vicinity of the axis and a second part carries a hook which can move axially and which is biased toward an end position relative to the cutting blade by a spring element. The hook has a concave side which faces toward the cutting blade and which functions to receive the cable to be stripped, and also includes a generally axially oriented stem with which the hook is connected to the tool. The cutting blade forms a helical or spiral slit in the cable.

SUMMARY

A cable stripping tool in accordance with some example embodiments is provided for making a circumferential or ring cut and a spiral cut in the jacket of a cable. The cable stripping tool includes a housing and a cutting blade mounted in the housing. The cutting blade is formed of a shaft and a cutting profile provided on an end of the shaft. The cutting profile is formed of a first blade portion and a second blade portion which are integrally formed with each other and are angled relative to each other. In use, the cutting blade penetrates the jacket of a cable to be cut. The cable stripping tool is then rotated in a first direction which causes the first blade portion to perform the cutting of the cable jacket and translate circumferentially around the cable to form a circumferential or ring cut. After the circumferential or ring cut is completed, the cable stripping tool is rotated in a second, opposite direction which causes the second blade portion to perform the cutting and translate circumferentially around the cable to form a spiral cut. The cutting by the second blade portion is done without disengaging the cutting blade from the cable. Once the desired length of jacket is cut, the cable stripping tool is again rotated in the first direction which causes the first blade portion to perform the cutting and translate circumferentially around the cable to form a circumferential or ring cut. This cutting by the first blade portion is done without disengaging the cutting blade from the cable. The cable stripping tool can then be pulled along the length of the cable to remove the cut section of the outer jacket from the remainder of the cable.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
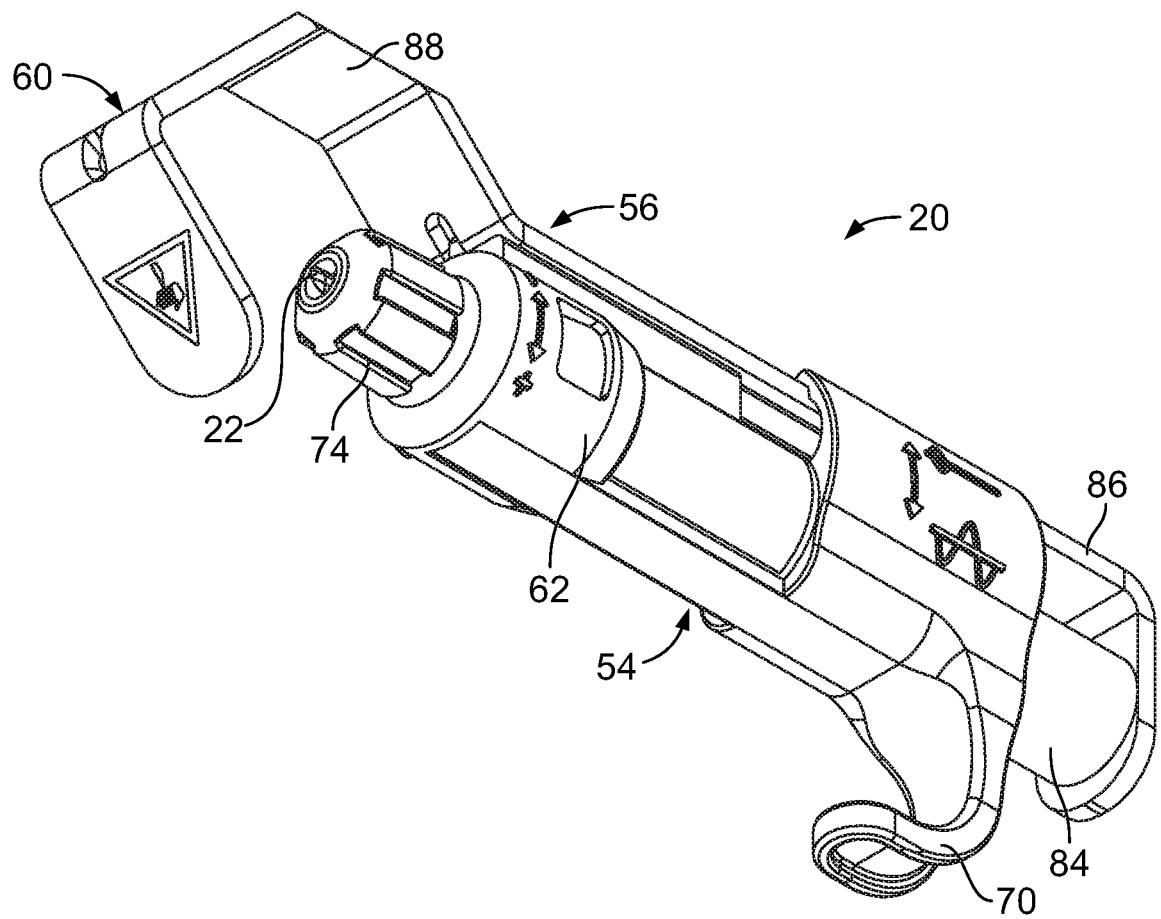
FIG. 1 is a perspective view of a first embodiment of a cable stripping tool.
Figure 2:
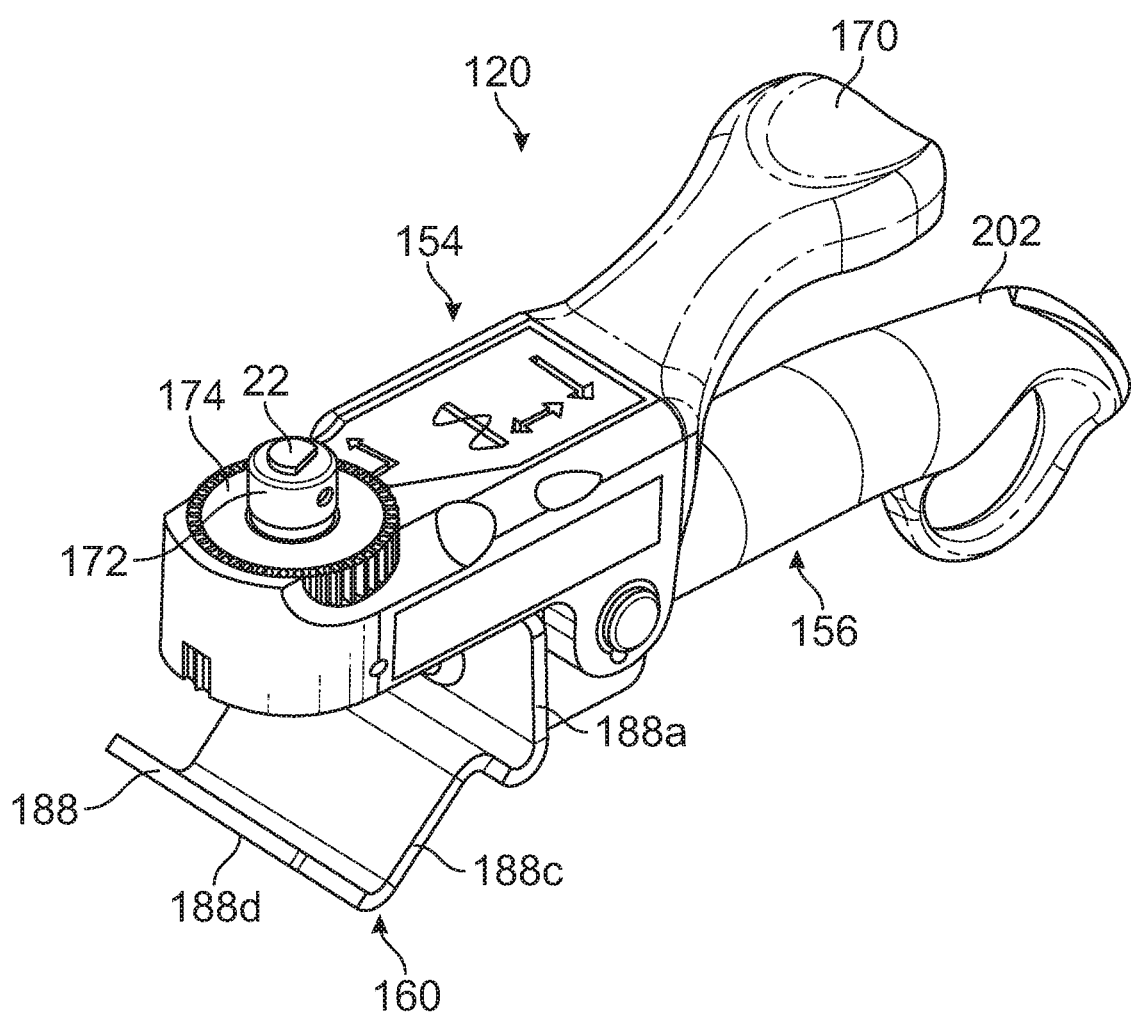
FIG. 2 is a perspective view of a second embodiment of a cable stripping tool.

A bi-directional cutting blade 22 is provided to strip the insulation/jacket from a cable (not shown). The bi-directional cutting blade 22 makes circumferential cuts, also known as ring cuts, in the cable, and makes a spiral cut in the cable. The bi-directional cutting blade 22 is mounted in a cable stripping tool in use. An example of a cable stripping tool 20 in which the bi-directional cutting blade 22 can be mounted is shown in FIGS. 1 and 12-14. Another example of a cable stripping tool 120 in which the bi-directional cutting blade 22 can be mounted is shown in FIGS. 2 and 15-17. It is to be understood that the cable stripping tools 20, 120 described herein are exemplary and other cable stripping tools may be provided for use with the bi-directional cutting blade 22. When the cable stripping tool 20, 120 is turned in an inner direction, the bi-directional cutting blade 22 forms a circumferential or ring cut around the circumference of the cable. When the cable stripping tool 20, 120 is turning in an outer, opposite direction, the bi-directional cutting blade 22 forms a spiral cut along the length of the cable. These cuts are performed without disengaging the bi-directional cutting blade 22 from the cable.

The bi-directional cutting blade 22 has a shaft 24 with a cutting profile 26 formed on a first end of the shaft 24. The shaft 24 may be cylindrical with a reduced width end portion 28 at the second end of the shaft 24 which second end is opposite to that of the cutting profile 26. A centerline 30 of the bi-directional cutting blade 22 extends along the length of the shaft 24 from the first end to the second end and through a center 44, 244, 344, 444 of the cutting profile 26. The center 44, 244, 344, 444 falls along centerline 30, such that the center 44, 244, 344, 444 is axially aligned with the centerline 30.

Figure 4:
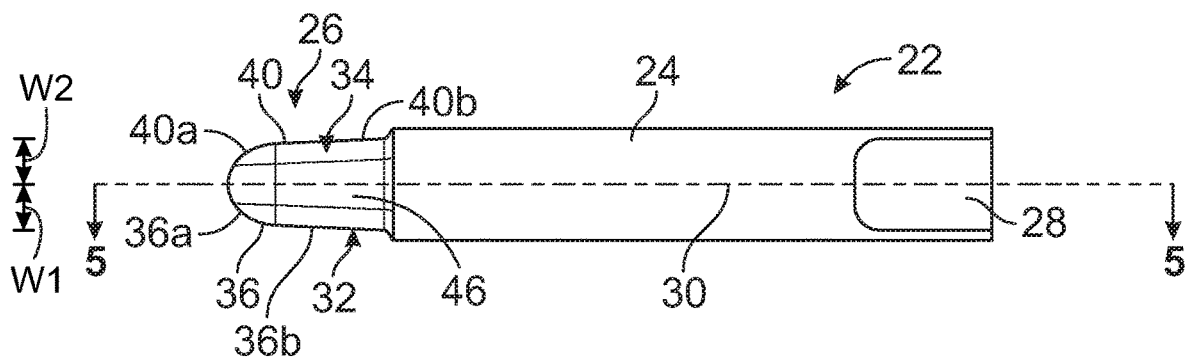
FIG. 4 is a side elevational view of the cutting blade.
Figure 5:
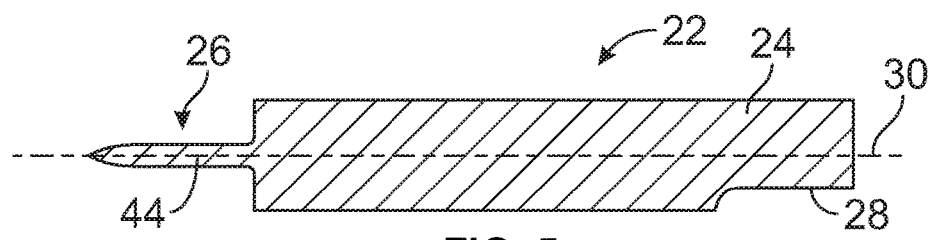
FIG. 5 is a cross-sectional view of the cutting blade along line 5-5 of FIG. 4.

The cutting profile 26 is formed of a first blade portion 32, 232, 332, 432 and a second blade portion 34, 234, 334, 434 which are integrally formed with each other and may be integrally formed with the shaft 24. The first blade portion 32, 232, 332, 432 has leading and trailing surfaces 32*a*, 32*b*, 232*a*, 232*b*, 332*a*, 332*b*, 432*a*, 432*b* which extend from a piercing and cutting edge 36, 236, 336, 436. As best shown in FIG. 4, the piercing and cutting edge 36 has a piercing portion 36*a* and a cutting portion 36*b* (these are not shown for piercing and cutting edges 236, 336, 436). The piercing portion 36*a* may be curved such that the piercing portion 36*a* curves relative to the centerline 30. The cutting portion 36*b* may be generally linear and extend parallel to, or generally parallel to, the centerline 30. The piercing portion 36*a* and the cutting portion 36*b* are continuous with each other and fall in the same plane. A width W1, see FIG. 4, of the first blade portion 32 is defined between the centerline 30 and the cutting portion 36*b* of the piercing and cutting edge 36. An axis 38 extends through the piercing and cutting edge 36 and extends along the width of the first blade portion 32 (FIG. 7); an axis 238 extends through the piercing and cutting edge 236 and extends along the width of the first blade portion 232 (FIG. 9); an axis 338 extends through the piercing and cutting edge 336 and extends along the width of the first blade portion 332 (FIG. 10); an axis 438 extends through the piercing and cutting edge 436 and extends along the width of the first blade portion 432 (FIG. 11). The axis 38, 238, 338, 438 extends through the centerline 30. Another axis 39, 239, 339, 439 is perpendicular to the axis 38, 238, 338, 438, and the center 44, 244, 344, 444 falls at the junction of the axes 38, 39, 238, 239, 338, 339, 438, 439. The leading and trailing surfaces 32*a*, 32*b*, 232*a*, 232*b*, 332*a*, 332*b*, 432*a*, 432*b* of the first blade portion 32, 232, 332, 432 are offset from the axis 38, 238, 338, 438. The second blade portion 34, 234, 334, 434 has leading and trailing surfaces 34*a*, 34*b*, 234*a*, 234*b*, 334*a*, 334*b*, 434*a*, 434*b* which extend from a piercing/cutting piercing and cutting edge 40, 240, 340, 440. As best shown in FIG. 4, the piercing and cutting edge 40 has a piercing portion 40*a* and a cutting portion 40*b* (these are not shown for piercing and cutting edges 240, 340, 440). The piercing portion 40*a* may be curved such that the piercing portion 40*a* curves relative to the centerline 30. The cutting portion 40*b* may be generally linear and extend parallel to, or generally parallel to, the centerline 30. The piercing portion 40*a* and the cutting portion 40*b* are continuous with each other and fall in the same plane. A width W2, see FIG. 4, of the second blade portion 34 is defined between the centerline 30 and the cutting portion 40*b* of the cutting and piercing edge 40. An axis 42 extends through the piercing and cutting edge 40 and along the width of the second blade portion 34 (FIG. 7); an axis 242 extends through the piercing and cutting edge 240 and along the width of the second blade portion 234 (FIG. 9); an axis 342 extends through the piercing and cutting edge 340 and along the width of the second blade portion 334 (FIG. 10); an axis 442 extends through the piercing and cutting edge 440 and along the width of the second blade portion 434 (FIG. 11). The axis 42, 242, 342, 442 extends through the centerline 30, 230, 330, 430. The axis 42, 242, 342, 442 of the second blade portion 34, 234, 334, 434 is offset from the axis 38, 238, 338, 438 of the first blade portion 32, 232, 332, 432 by a predetermined angle α. Angle α a is any angle between about 0 degrees and about 90 degrees, more preferably between about 0 degrees and about 60 degrees, and even more preferably between about 0 degrees and about 45 degrees. As shown, angle α is 15 degrees. The leading and trailing surfaces 34*a*, 34*b*, 234*a*, 234*b*, 334*a*, 334*b*, 434*a*, 434*b* of the second blade portion 34, 234, 334, 434 are offset from the axis 42, 242, 342, 442.

Figure 3:
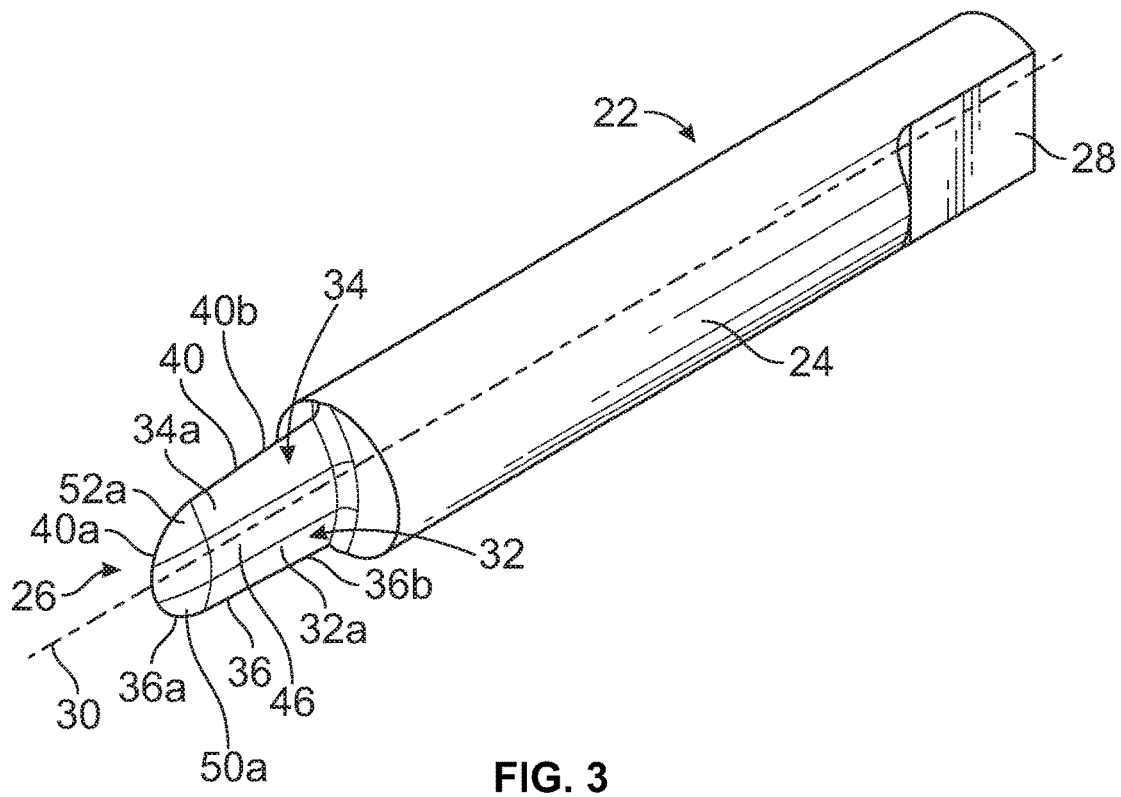
FIG. 3 is a perspective view of a cutting blade that can be used with the cable stripping tools.
Figure 6:
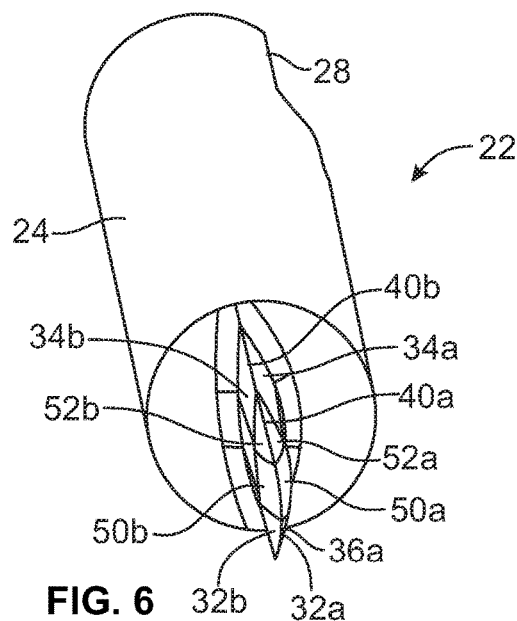
FIG. 6 is a perspective view of the cutting blade.
Figure 7:
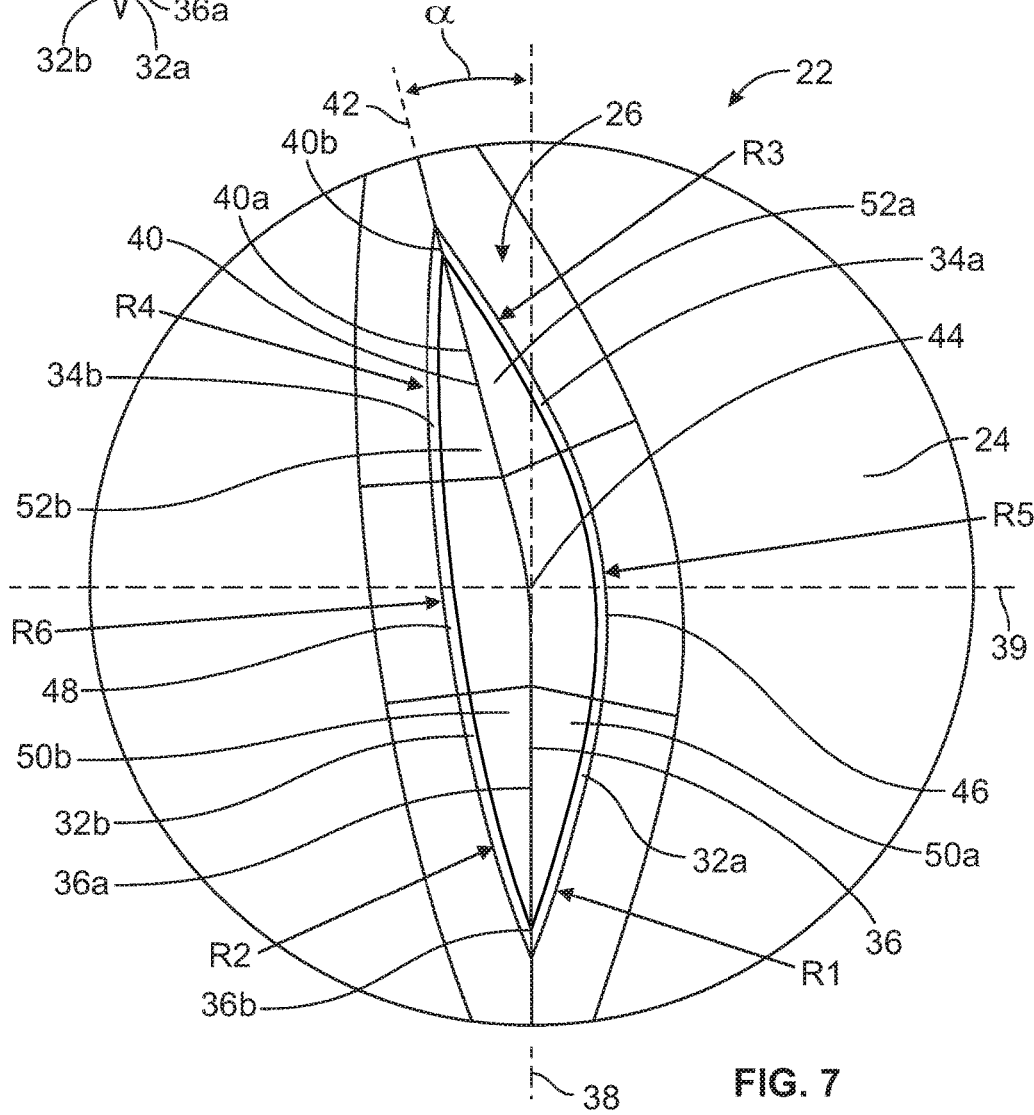
FIG. 7 is an end elevational view of the cutting blade.
Figure 8:
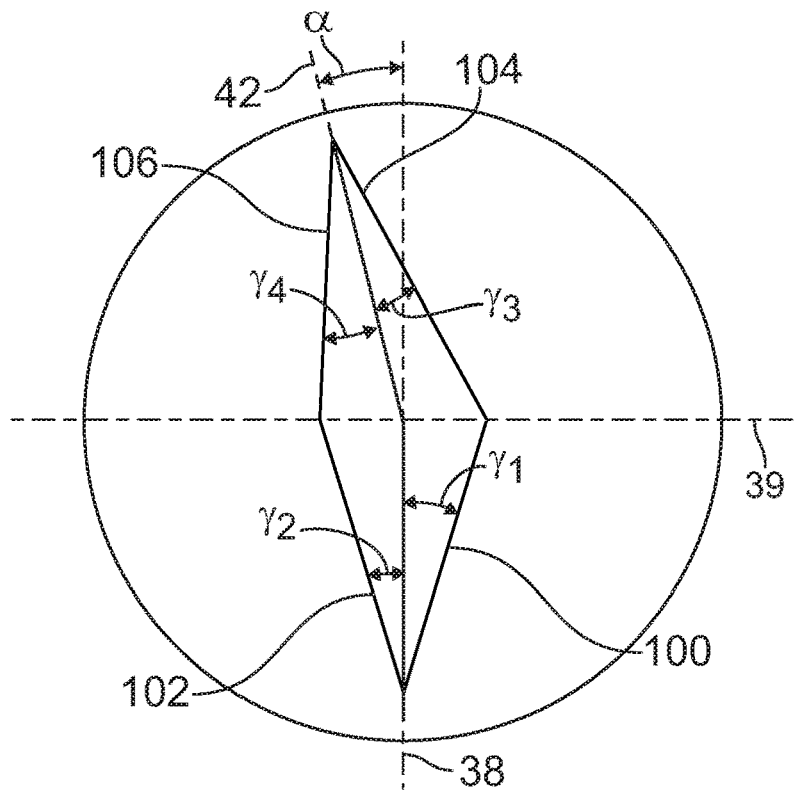
FIG. 8 is a schematic view of the lines of action formed by the cutting blade.
Figure 9:
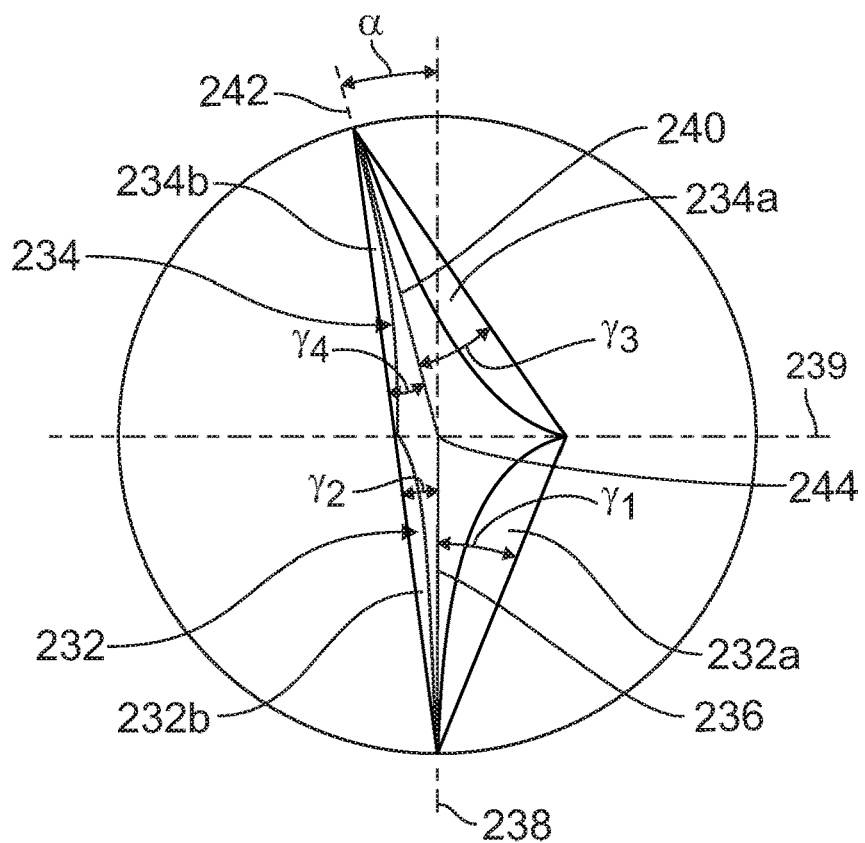
FIGS. 9-11 are end elevational views of alternate cutting blades.

As shown in FIG. 7, the leading surface 32*a* may be radiused at a radius R1 relative to the center 44 of the cutting blade 22; the trailing surface 32*b* may be radiused at a radius R2 relative to the center 44; the leading surface 34*a* may be radiused at a radius R3 relative to the center 44; and the trailing surface 34*b* may be radiused at a radius R4 relative to the center 44. The center 44 falls along the centerline 30 such that the center 44 is axially aligned with the centerline 30 and is at the junction between the axes 38, 42. Radii R1 and R2 are tangential to the axis 38. Radii R3 and R4 are tangential to the axis 42. FIG. 8 shows a first line of action 100 formed by an imaginary line defined by angle γ1 which extends between the axis 38 and a point on the leading surface 32*a*; a second line of action 102 formed by an imaginary line defined by angle γ2 which extends between the axis 38 and a point on the trailing surface 32*b*; a third line of action 104 formed by an imaginary line defined by angle γ3 which extends between the axis 42 and a point on the leading surface 34*a*; and a fourth line of action 106 formed by an imaginary line defined by angle.gamma.4 which extends between the axis 42 and a point on the trailing surface 34*b*. The angles γ1, γ2, γ3, γ4 may be any of about 0 degrees to about 45 degrees. The radii R1-R4 are tangential to the lines of action 100, 102, 104, 106 defined by angles γ1, γ2, γ3, γ4. The radiused surfaces 32*a*, 32*b*, 34*a*, 34*b* may be convex as shown in FIGS. 3, 6 and 7. Alternatively, the radiused surfaces 232*a*, 232*b*, 234*a*, 234*b* may be concave as shown in FIG. 9. The radii R1, R2 of the leading and trailing surfaces 32*a*, 32*b*, 232*a*, 232*b* of the first blade portion 32, 232 may be the same, or may differ. The radii R3, R4 of the leading and trailing surfaces 34*a*, 34*b*, 234*a*, 234*b* of the second blade portion 34, 234 may be the same, or may differ. The radii R1, R3 of the leading surfaces 32*a*, 34*a*, 232*a*, 234*b* of the first and second blade portions 32, 34, 232, 234 may be the same, or may differ. The radii R2, R4 of the trailing surfaces 32*b*, 34*b*, 232*a*, 234*b* of the first and second blade portions 32, 34, 232, 234 may be the same, or may differ. A transition leading surface 46 may be provided between and connects the leading surfaces 32*a*, 34*a* to provide a continuous leading surface. The transition leading surface 46 has a different radius R5 than the radii R1, R3 of the leading surfaces 32*a*, 34*a*. A transition trailing surface 48 is provided between and connects the trailing surfaces 32*b*, 34*b* to provide a continuous trailing surface. The transition trailing surface 48 has a different radius R6 than the radii R2, R4 of the trailing surfaces 32*b*, 34*b*. As shown, each leading and trailing surfaces 32*a*, 32*b* of the first blade portion 32 has a radius R1, R3 of 0.4" and the transition leading surface 46 has a radius R5 of 0.109", and each leading and trailing surface 34*a*, 34*b* of the second blade portion 34 has a radius R2, R4 of 0.4" and the transition trailing surface 48 has a radius R6 of 0.657".

As shown in FIG. 6, a tapered crown portion 50*a*, 50*b* may be provided at the end of each of the leading and trailing surfaces 32*a*, 32*b* of the first blade portion 32 and extends along the piercing portion 36*a* of the piercing and cutting edge 36; the crown portion 50a, 50b being radiused. A tapered crown portion 52a, 52b may be provided at the end of each of the leading and trailing surfaces 34a, 34b of the second blade portion 34 and extends along the piercing portion 40a of the piercing and cutting edge 40; the crown portion 52a, 52b being radiused.

Figure 10:
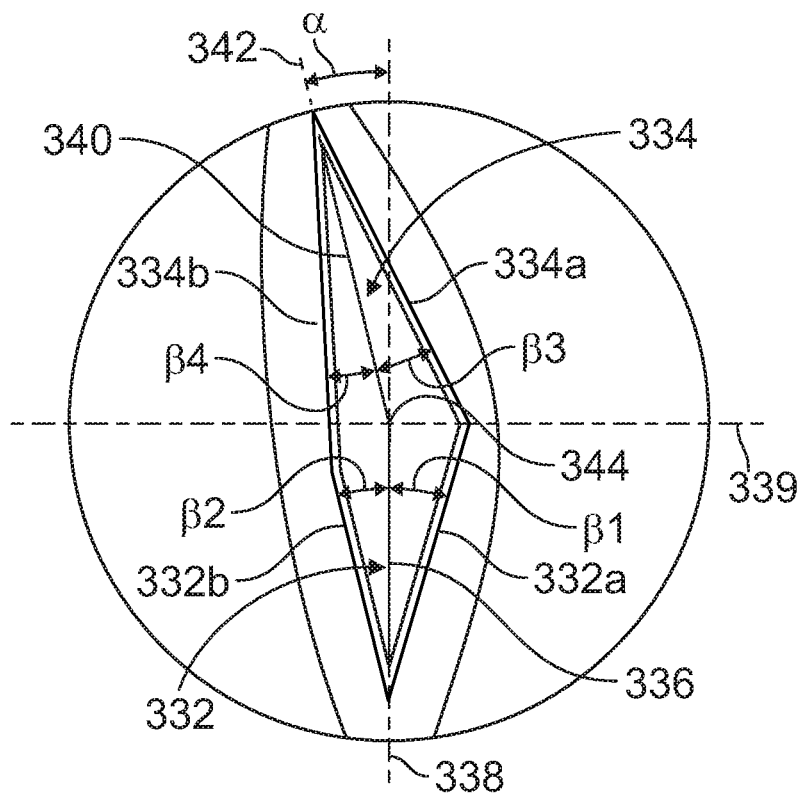
Figure 11:
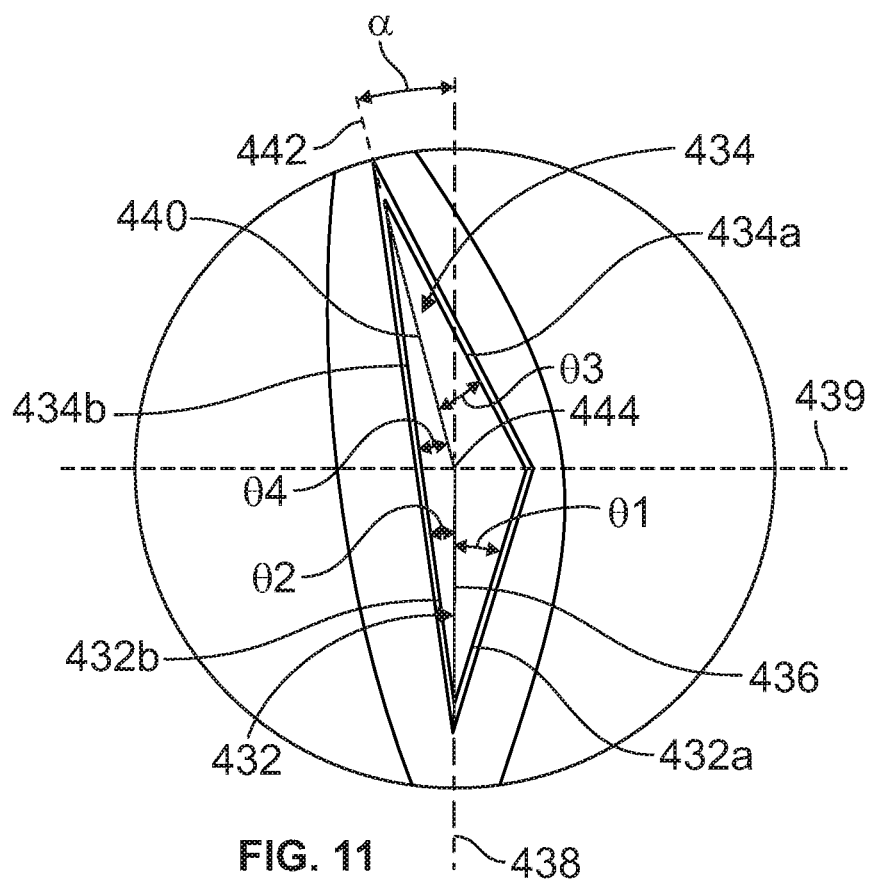
Figure 12:
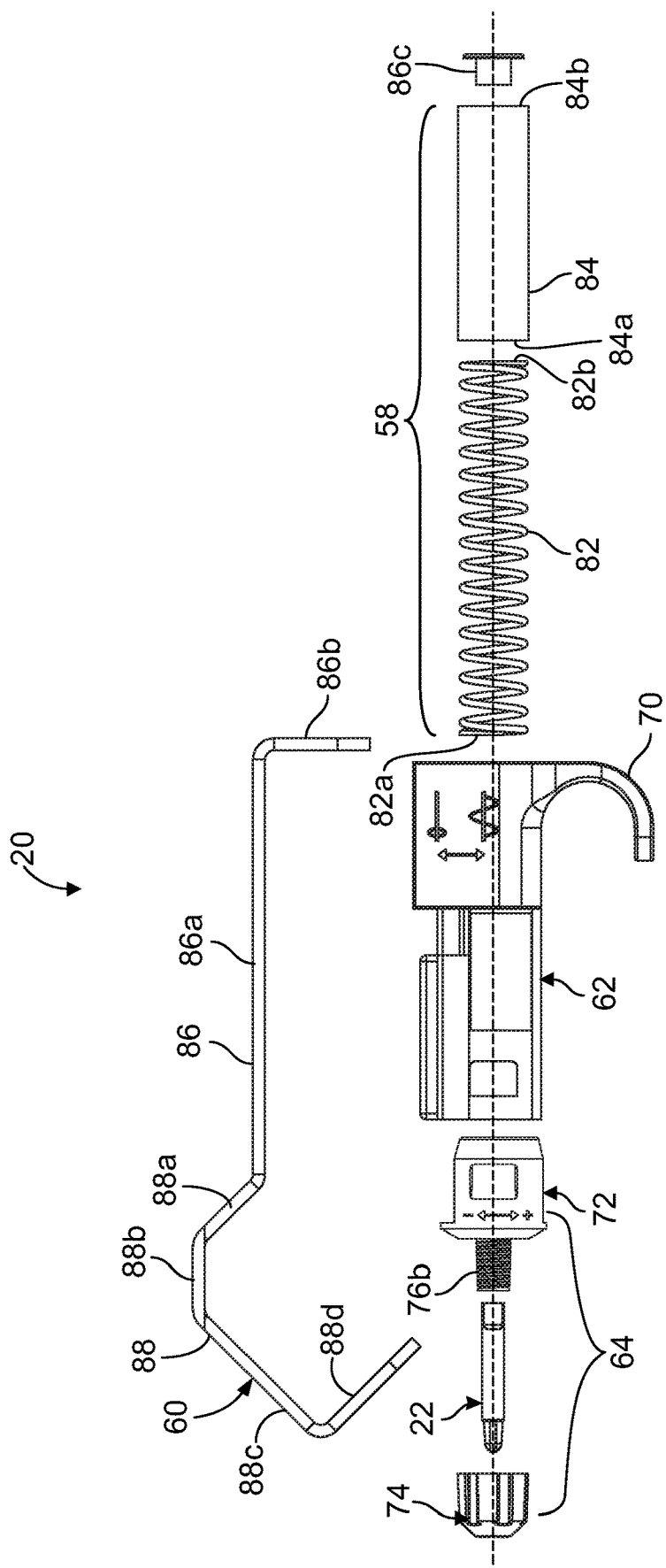
FIG. 12 is an exploded side elevational view of the cable stripping tool of FIG. 1.
Figure 13:
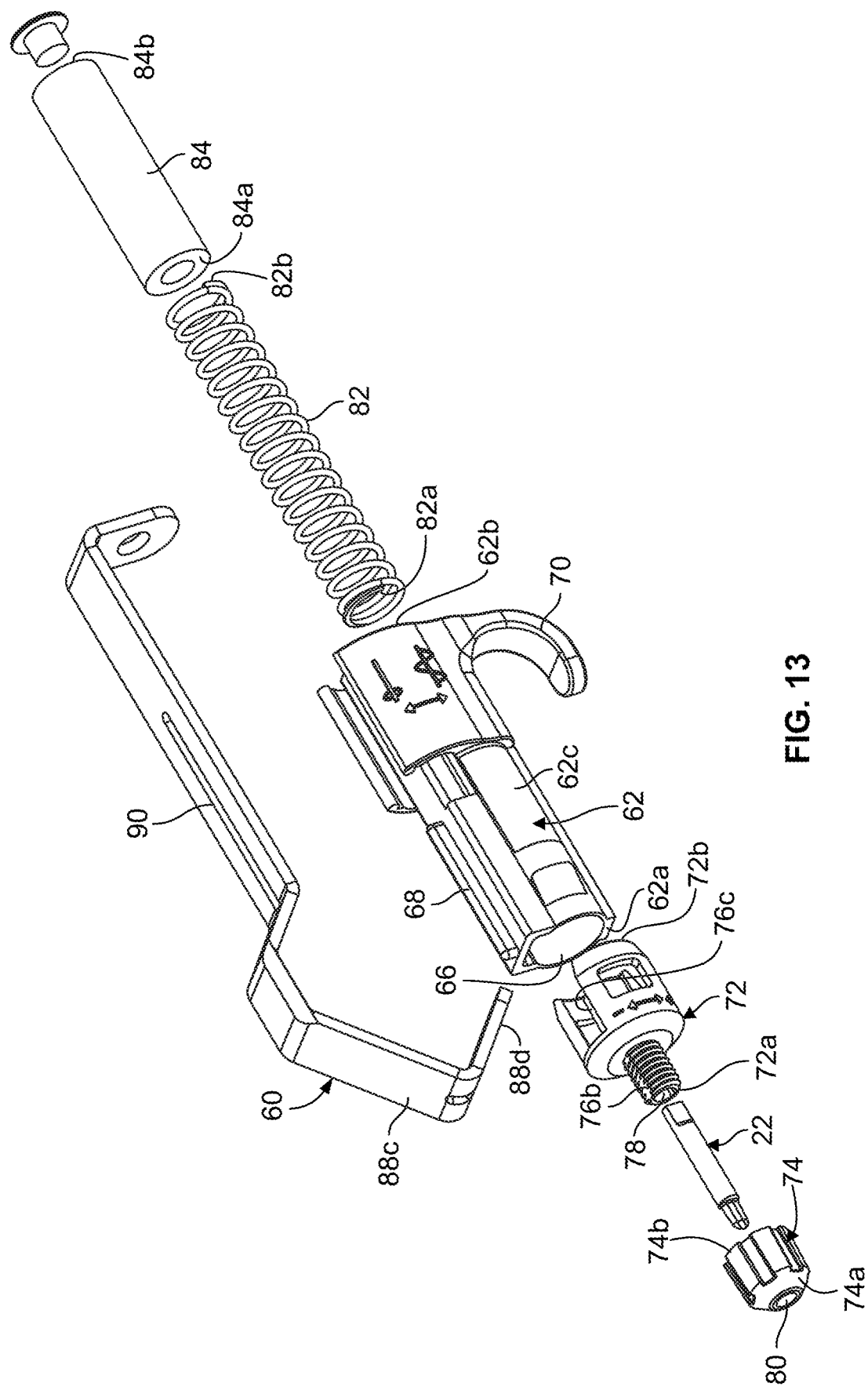
FIG. 13 is an exploded perspective view of the cable stripping tool of FIG. 1.
Figure 14:
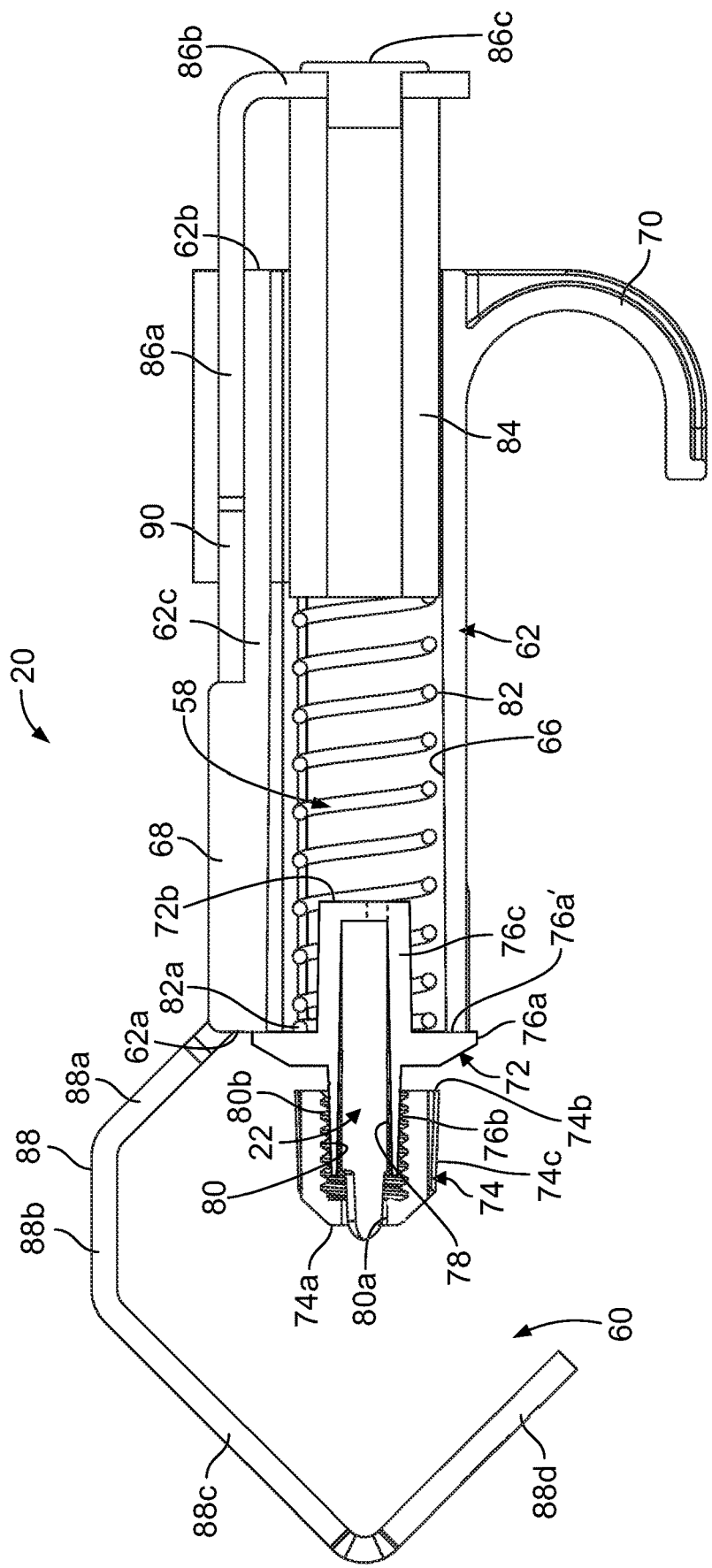
FIG. 14 is a cross-sectional view of the cable stripping tool of FIG. 1.
Figure 15:
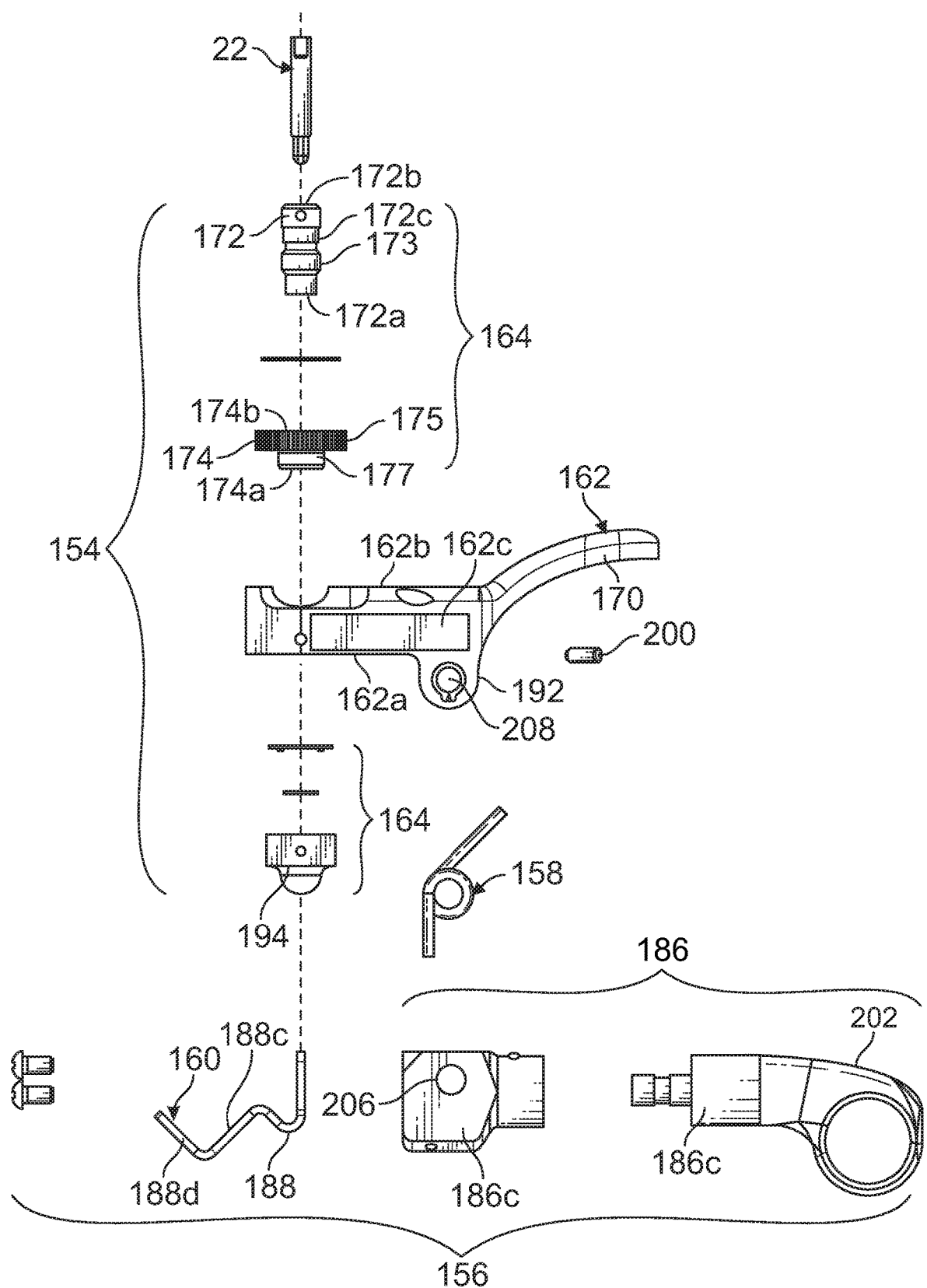
FIG. 15 is an exploded side elevational view of the cable stripping tool of FIG. 2.
Figure 16:
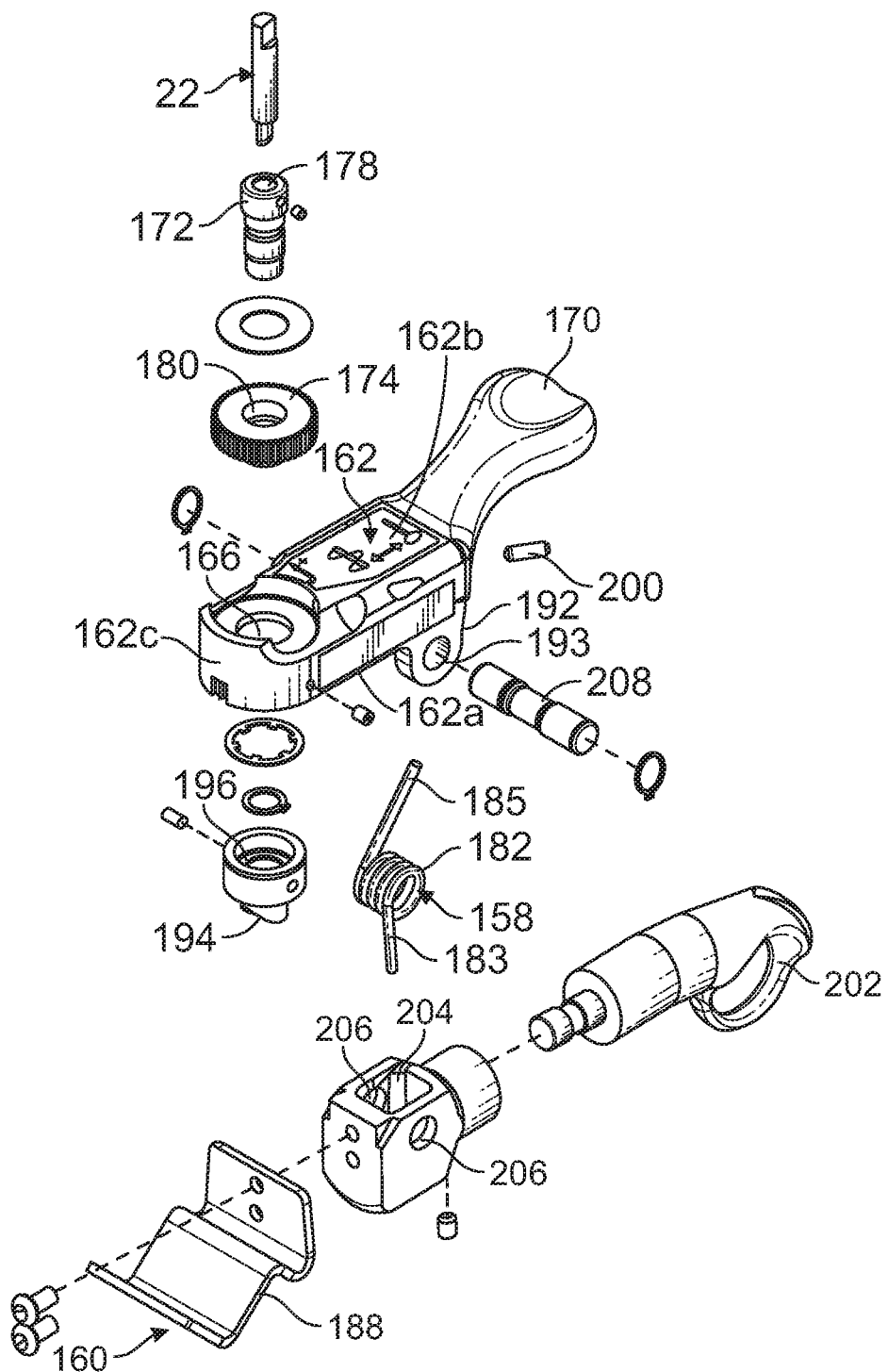
FIG. 16 is an exploded perspective view of the cable stripping tool of FIG. 2.
Figure 17:
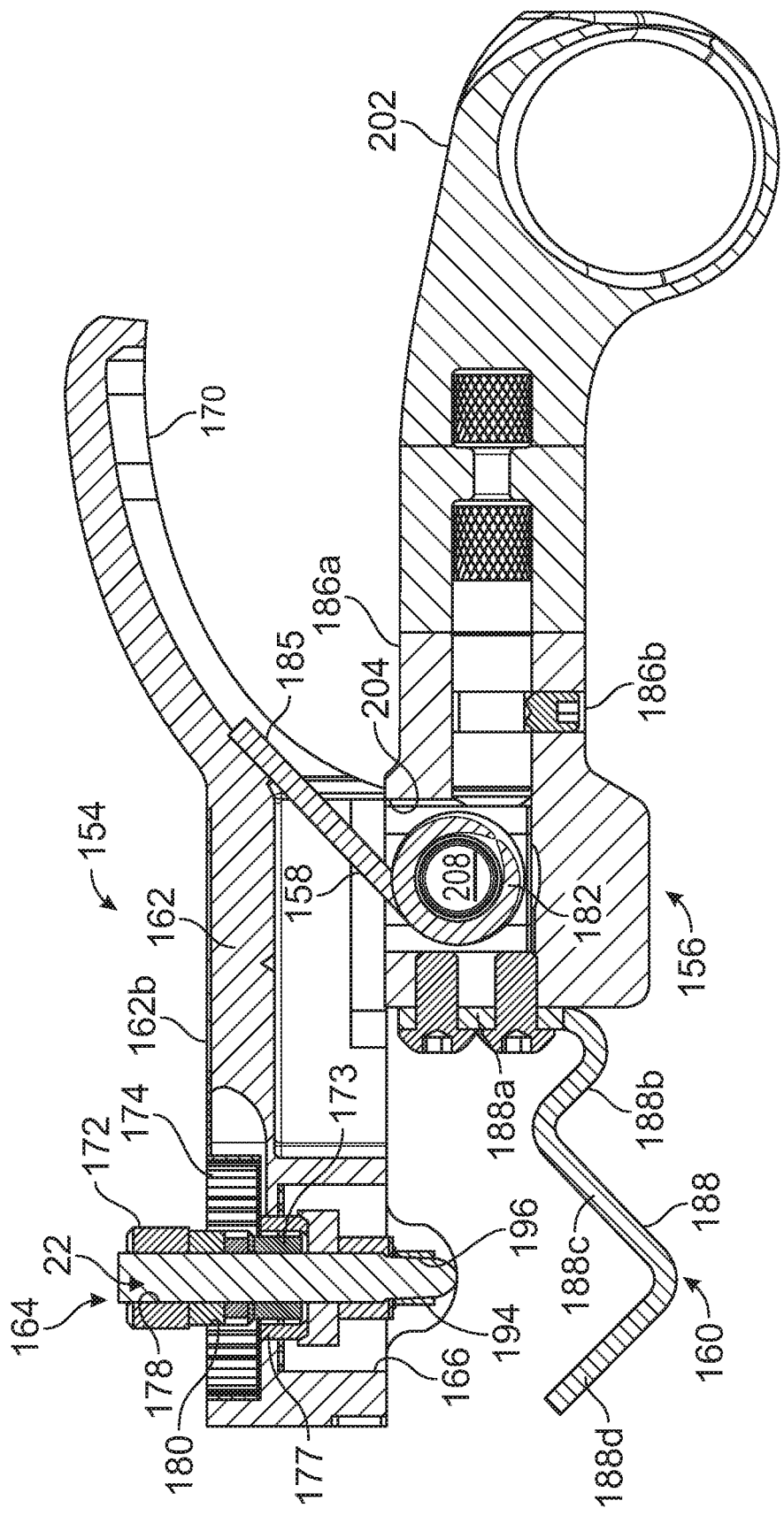
FIG. 17 is a cross-sectional view of the cable stripping tool of FIG. 2.

The leading and trailing surfaces 332a, 332b, 334a, 334b may be planar as shown in FIG. 10. The leading and trailing surfaces 432a, 432b, 434a, 434b may be planar as shown in FIG. 11.

As shown in FIG. 10, the leading surface 332a is planar and is at an angle β1 relative to the axis 338; the trailing surface 332b is planar and is at an angle β2 relative to the axis 338; the leading surface 334a is planar and is at an angle β3 relative to the axis 342; and the trailing surface 334b is planar and is at an angle β4 relative to the axis 342. The angles β1 and β2 of the leading and trailing surfaces 332a, 332b of the first blade portion 332 may be the same, or may differ. The angles β3 and β4 of the leading and trailing surfaces 334a, 334b of the second blade portion 334 may be the same, or may differ. The angles β1 and β3 of the leading surfaces 332a, 334a of the first and second blade portions 332, 334 may be the same, or may differ. The angles β2 and β4 of the trailing surfaces 332b, 334b of the first and second blade portions 332, 334 may be the same, or may differ. The angles β1-β4 may be any of about 0 degrees to about 45 degrees. The leading and trailing surfaces 332a, 332b, 334a, 334b form line of actions of the surfaces 332a, 332b, 334a, 334b.

As shown in FIG. 11, the trailing surfaces 432b, 434b are planar and fall on the same plane. The leading surface 432a is planar and is at an angle θ1 relative to the axis 438; the trailing surface 432b is planar and is at an angle θ2 relative to the axis 438; the leading surface 434a is planar and is at an angle θ3 relative to the axis 442; and the trailing surface 434b is planar and is at an angle θ4 relative to the axis 442. The angles θ1 and θ2 of the leading and trailing surfaces 432a, 432b of the first blade portion 432 may be the same, or may differ. The angles θ3 and θ4 of the leading and trailing surfaces 434a, 434b of the second blade portion 434 may be the same, or may differ. The angles θ1 and θ3 of the leading surfaces 432a, 434a of the first and second blade portions 432, 434 may be the same, or may differ. The angles θ2 and θ4 of the trailing surfaces 432b, 434b of the first and second blade portions 432, 434 may be the same, or may differ. The angles θ1-θ4 may be any of about 0 degrees to about 45 degrees. The leading and trailing surfaces 432a, 432b, 434a, 434b form line of actions of the surfaces 432a, 432b, 434a, 434b.

As shown in FIGS. 1 and 12-14, the exemplary cable stripping tool 20 is formed of a user gripping portion 54, a cable engaging portion 56 attached to the user gripping portion 54, the cable engaging portion 56 being spring-loaded via a spring 58. The spring 58 biases the cable engaging portion 56 such that a hook-shaped end 60 of the cable engaging portion 56 is preloaded to move in a direction toward the user gripping portion 54, and toward the bi-directional cutting blade 22 which is mounted on the cable stripping tool 20 as described herein. The use of the cable stripping tool 20 is described with regard to the embodiment of FIG. 7 but any of the embodiments of FIGS. 9-11 can be used in the same manner.

The user gripping portion 54 is formed from a housing 62 and an adjustment knob assembly 64 attached to the housing 62.

The housing 62 has an inner surface 62a, an outer surface 62b and a side surface 62c extending between the inner and outer surfaces 62a, 62b. A passageway 66 extends through the housing 62 from the inner surface 62a to the outer surface 62b. An elongated rib 68 is provided on the side surface 62c and extends outwardly therefrom. A handle 70 extends outwardly from the side surface 62c and may be diametrically opposed to the rib 68.

The adjustment knob assembly 64 is formed from a cutting blade receiving part 72 and a grasping part 74 rotatably mounted on the cutting blade receiving part 72. The cutting blade receiving part 72 is attached to the housing 62, and the bi-directional cutting blade 22 is mounted in the cutting blade receiving part 72. The position of the grasping part 74 is adjustable relative to the cutting blade receiving part 72 to expose more, or less, of the bi-directional cutting blade 22.

The cutting blade receiving part 72 has an intermediate section 76a which substantially closes the inner end of the passageway 66 of the housing 62, an inner section 76b which extends inwardly from the intermediate section 76a and has a thread form on its outer surface, and an outer section 76c which extends outwardly from the intermediate section 76a. A passageway 78 extends through the cutting blade receiving part 72 from an inner surface 72a to an outer surface 72b. The passageway 78 is shaped to mirror the shape of the shaft 24 of the bi-directional cutting blade 22.

The grasping part 74 has an inner surface 74a, an outer surface 74b and a side surface 74c extending between the inner and outer surfaces 74a, 74b. The side surface 74c may have knurling thereon to enable a user to easily grasp the grasping part 74. A passageway 80 extends through the grasping part 74 from the inner surface 74a to the outer surface 74b. The passageway 80 has an inner unthreaded section 80a, and an outer threaded section 80b. The inner unthreaded section 80a has a diameter which is smaller than the diameter of the outer threaded section 80b. The outer threaded section 80b threadedly mates with the inner section 76b of the cutting blade receiving part 72. The grasping part 74 can be rotated around the inner section 76b of the cutting blade receiving part 72 towards or away from the inner end surface 62a of the housing 62.

The spring 58 is formed of a coil 82 which abuts against a sleeve 84. The spring 58 seats within the passageway 66 of the housing 62. An inner end 82a of the coil 82 abuts against the outer end 76a' of the intermediate section 76a of the cutting blade receiving part 72 and the coil 82 surrounds the outer section 76c of the cutting blade receiving part 72. An inner end 84a of the sleeve 84 abuts against an outer end 82b of the coil 82 and the sleeve 84 extends outwardly from the outer end 62b of the housing 62 such that an outer end 84b of the sleeve 84 is outwardly of the housing 62. The spring 58 can linearly translate relative to the housing 62.

The cable engaging portion 56 is attached to the user gripping portion 54 via the spring 58 and is linearly moveable relative thereto. The cable engaging portion 56 includes an attachment part 86 and a cable gripping part 88.

The attachment part 86 is generally L-shaped and has an inner elongated section 86a, an outer section 86b which extends from an outer end of the inner section 86a and is generally perpendicular to the inner section 86a, and a fastener 86c which attaches the outer section 86b to the outer end 84b of the sleeve 84. The fastener 86c may take the form of a plug which seats through an aperture in the outer section 86b, or may take a variety of other means for fastening. The attachment part 86 may be affixed to the sleeve 84, for example by adhesive or welding. The inner section 86a has an elongated slot 90 which extends along at least a portion of the length thereof. The inner section extends along the length of the housing 62 and the rib 68 seats within the slot 90.

The cable gripping part 88 forms the hook-shaped end 60. As shown, the cable gripping part 88 has a first section 88*a* which extends at an angle outwardly from an inner end of the attachment part 86, a second section 88*b* which extends at an angle from the first section 88*a* and is generally parallel to the housing 62, a third section 88*c* which extends inwardly at an angle from the second section 88*b*, and a fourth section 88*d* which extends at an angle from the third section 88*c*. The third and fourth sections 88*c*, 88*d* generally form a V-shape in which the cable seats. It is to be understood that the specific shape of the cable gripping part 88 shown is exemplary and that the cable gripping part 88 can take other forms so long as the cable is held therein. When the tool 20 is assembled, the hook-shaped end 60 aligns with the cutting profile 26 on the bi-directional cutting blade 22. The spring 58 always biases the cable engaging portion 56 such that the cable gripping part 88 is biased toward the housing 62 and the attachment part 86 is biased outwardly.

In use, the shaft 24 of the bi-directional cutting blade 22 is inserted into the passageway 78 in the cutting blade receiving part 72. The bi-directional cutting blade 22 extends inwardly from the inner section 76*b* of the cutting blade receiving part 72 and faces the hook-shaped end 60. The grasping part 74 is attached to the cutting blade receiving part 72 by the threaded connection. The cable is inserted between the cable gripping part 88 and the bi-directional cutting blade 22. The amount of the bi-directional cutting blade 22 that is exposed is adjusted by rotating the grasping part 74 to a desired position to expose more or less of the bi-directional cutting blade 22 which corresponds to the depth of the cut by the bi-directional cutting blade 22. The spring 58 biases the cable engaging portion 56, and thus the cable, toward the bi-directional cutting blade 22. The rib 68 translates along slot 90 to maintain engagement of the cable engaging portion 56 with the housing 62. The piercing portions 36*a*, 40*a* of the piercing and cutting edges 36, 40 of the first and second blade portions 32, 34 penetrate into the outer jacket of the cable, followed by the cutting portions 36*b*, 40*b* as the spring force by spring 58 causes the bi-directional cutting blade 22 to further penetrate into the outer jacket of the cable. As a result of the spring force, the piercing and cutting edges 36, 40 of the first and second blade portions 32, 34 penetrate completely into the outer jacket until the outer surface of the outer jacket contacts the inner end 74*a* of the grasping part 74

The cable stripping tool 20 is then rotated in a first direction which causes the first blade portion 32 to perform the cutting of the cable jacket and translate circumferentially around the cable. Since the axis 38 of the first blade portion 32 is perpendicular to the axis of the cable being cut, the circumferential or ring cut is formed. After the circumferential or ring cut is completed, the cable stripping tool 20 is rotated in the second, opposite direction which causes the second blade portion 34 to perform the cutting and translate circumferentially around the cable. Since the axis 42 of the second blade portion 34 is offset relative to the axis of the cable being cut, the spiral cut is formed. The cutting by the second blade portion 34 is done without disengaging the bi-directional cutting blade 22 from the cable. Once the desired length of jacket is cut, the cable stripping tool 20 is again rotated in the first direction which causes the first blade portion 32 to perform the cutting and translate circumferentially around the cable to form the circumferential or ring cut. This cutting by the first blade portion 32 is done without disengaging the bi-directional cutting blade 22 from the cable. The cable stripping tool 20 can then be pulled along the length of the cable to remove the cut section of the outer jacket from the remainder of the cable.

As shown in FIGS. 2 and 15-17, the cable stripping tool 120 is formed of a user gripping portion 154, a cable engaging portion 156 attached to the user gripping portion 154, the cable engaging portion 156 being spring-loaded via a spring 158. The spring 158 biases the user gripping portion 154 such that the bi-directional cutting blade 22 mounted on the user gripping portion 154 is preloaded to move in a direction toward a hook-shaped end 160 of the cable engaging portion 156 as described herein.

The user gripping portion 154 is formed from a housing 162 and an adjustment knob assembly 164 attached to the housing 162.

The housing 162 has an inner surface 162*a*, an outer surface 162*b* and a side surface 162*c* extending between the inner and outer surfaces 162*a*, 162*b*. A passageway 166 extends through the housing 162 from the inner surface 162*a* to the outer surface 162*b*. A handle 170 extends outwardly from the side surface 162*c*. A pair of spaced apart ears 192 extend from the inner surface 162*a*, each of which has an aperture 193 therethrough. The passageway 166 has an inner section 166*a*, an intermediate section and an outer section. The intermediate section has a reduced diameter relative to the inner and outer sections. A separate cap 194 may be provided to substantially close the inner end of the passageway 166. The cap 194 has a passageway 196 therethrough which aligns with the passageway 166.

The adjustment knob assembly 164 is formed from a cutting blade receiving part 172 and a grasping part 174. The grasping part 174 is mounted on the housing 162 and rotatable relative thereto. The cutting blade receiving part 172 is rotatably mounted on the grasping part 174 and can linearly translate relative to the grasping part 174 and to the housing 162 toward or away from the cable engaging portion 156. The bi-directional cutting blade 22 is mounted in the cutting blade receiving part 172. The position of the cutting blade receiving part 172 is adjustable relative to the grasping part 174 to expose more, or less, of the bi-directional cutting blade 22.

The grasping part 174 has an enlarged knurled portion 175 and a smaller diameter portion 177 extending therefrom. The exterior surface of the smaller diameter portion 177 is threaded. A passageway 180 extends through the grasping part 174 from an inner end 174*a* to an outer, opposite end 174*b*. The portion of the passageway 180 through the smaller diameter portion 177 is threaded. The enlarged knurled portion 175 seats in the outer section of the passageway 166 of the housing 162 and the smaller diameter portion 177 seats in the intermediate section of the passageway 166 and extends into the inner section of the passageway 166. The grasping part 174 is rotational relative to the housing 162, but cannot linearly translate relative to the housing 162.

The cutting blade receiving part 172 seats within the passageway 180 of the grasping part 174 and within the inner section 166*a* of the passageway 166 of the housing 162. The cutting blade receiving part 172 has an inner end 172*a*, an outer end 172*b* and a side wall 172*c* therebetween. A passageway 178 extends from the inner end 172*a* to the outer end 172*b* and aligned with the passageway 196 in the cap 194. A portion 173 of the side wall 172*c* is threaded and engages with the threaded portion of the passageway 180 in the grasping part 174.

The shaft 24 of the bi-directional cutting blade 22 seats within the passageway 178 of the cutting blade receiving part 172 and the bi-directional cutting blade 22 extends inwardly from the cutting blade receiving part 172. The bi-directional cutting blade 22 is secured to the cutting blade receiving part 172 by suitable means, such as a set screw, such that the bi-directional cutting blade 22 and the cutting blade receiving part 172 translate together. Alternatively, the bi-directional cutting blade 22 and cutting blade receiving part 172 may be integrally formed.

In use, the user grasps the knurled portion 175 of the grasping part 174 and the grasping part 174 is rotated relative to the housing 162 which causes the cutting blade receiving part 172 and its attached bi-directional cutting blade 22 to linearly translate relative to the housing 162 via the threaded engagement of the cutting blade receiving part 172 and the grasping part 174. When the adjustment knob assembly 164 is turned to a desired position, thereby setting the bi-directional cutting blade 22 in its desired position, a set screw 200 is engaged with the housing 162 and with the knurled portion 175 to prevent the further rotation of the adjustment knob assembly 164, thereby preventing further translation of the bi-directional cutting blade 22.

The cable engaging portion 156 is attached to the user gripping portion 154 via the spring 158 and is pivotable relative thereto. The cable engaging portion 156 includes an attachment part 186 and a cable gripping part 188.

The attachment part 186 has an inner surface 186a, an outer surface 186b and a side surface 186c extending between the inner and outer surfaces 186a, 186b. A handle 202 extends outwardly from the side surface 186c. A recess 204 is provided in the inner surface 186a of the attachment part 186 and a pair of apertures 206 are provided through the side surface 186c and are in communication with the recess 204.

Figure 18:
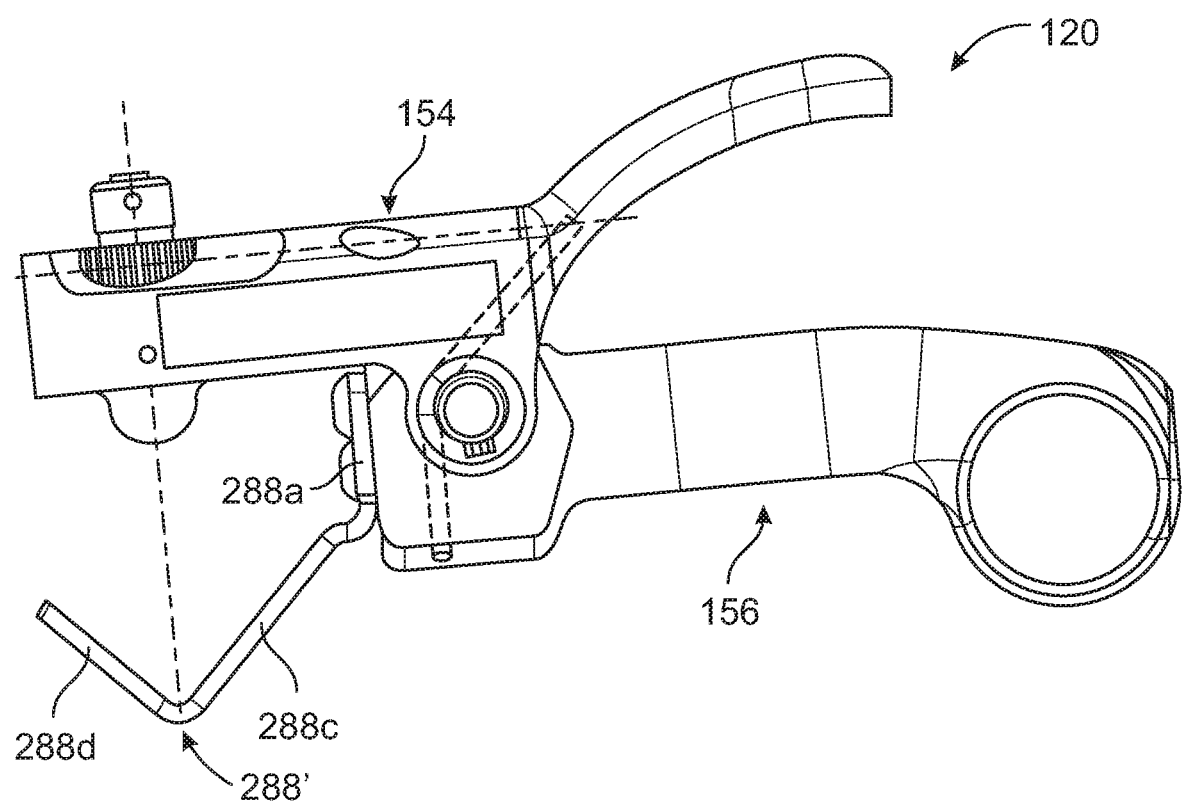
FIG. 18 is a perspective view of the cable stripping tool of FIG. 2 with a modified cable gripping part.

The cable gripping part 188 forms the hook-shaped end 160. As shown, the cable gripping part 188 is generally shaped like a W and has a first section 188a which is attached to an end of side surface 186c of the attachment part 186, a second section 188b which extends at an angle from the first section 188a, a third section 188c which extends at an angle from the second section 188b, and a fourth section 188d which extends at an angle from the third section 188c. The third and fourth sections 188c, 188d generally form a V-shape in which the cable seats. It is to be understood that the specific shape of the cable gripping part 188 shown is exemplary and that the cable gripping part 188 can take other forms so long as the cable is held therein. For example, FIG. 18 shows an alternate cable gripping part 288' which includes only three sections 288a, 288c and 288d.

The spring 158 is formed of a coil 182 having an inner leg 183 extending therefrom and an outer leg 185 extending therefrom. The coil 182 seats within the recess 204 of the attachment portion 186 and the inner leg 183 is attached to the attachment part 186. The outer leg 185 abuts against the inner surface 162a of the housing 162. A pivot pin 208 extends through the apertures 193 in the ears 192, through the apertures 206 in the attachment part 186 and through the coil 182 to secure the spring 158, the attachment part 186 and the housing 162 together, while allowing the housing 162 and the attachment part 186 to pivot relative to each other. When the tool 120 is assembled, the hook-shaped end 160 aligns with the cutting profile 26 on the bi-directional cutting blade 22. The spring 158 always biases the user gripping portion 154 toward the cable engaging portion 156.

In use, the shaft 24 of the bi-directional cutting blade 22 is inserted into the passageway 178 in the cutting blade receiving part 172 and extends through the passageway 196 in the cap 194. The grasping part 174 is attached to the cutting blade receiving part 172 by the threaded connection. The user holds the tool 120 by the handles 170, 202 and pivots the gripping portion 154 so that it is separated from the cable engaging portion 156. The cable is inserted between the cable gripping part 188 and the bi-directional cutting blade 22. The amount of the bi-directional cutting blade 22 that is exposed is adjusted by rotating the grasping part 174 to a desired position to expose more or less of the bi-directional cutting blade 22 which corresponds to the depth of the cut by the bi-directional cutting blade 22. When the pressure on the handles 170, 202 is released, the spring 158 biases the gripping portion 154, and thus the bi-directional cutting blade 22, toward the cable and the cable engaging portion 156. The piercing portions 36a, 40a of the piercing and cutting edges 36, 40 of the first and second blade portions 32, 34 penetrate into the outer jacket of the cable, followed by the cutting portions 36b, 40b as the spring force by spring 158 causes the bi-directional cutting blade 22 to further penetrate into the outer jacket of the cable. As a result of the spring force, the piercing and cutting edges 36, 40 of the first and second blade portions 32, 34 penetrate completely into the outer jacket until the outer surface of the outer jacket contacts the inner end of the cap 194.

The cable stripping tool 120 is then rotated in a first direction which causes the first blade portion 32 to perform the cutting of the cable jacket and translate circumferentially around the cable as the cutting portion 36b cuts the cable jacket. Since the axis 38 of the first blade portion 32 is perpendicular to the axis of the cable being cut, the circumferential or ring cut is formed. After the circumferential or ring cut is completed, the cable stripping tool 120 is rotated in the second, opposite direction which causes the second blade portion 34 to perform the cutting and translate circumferentially around the cable as the cutting portion 40b cuts the cable jacket. Since the axis 42 of the second blade portion 34 is offset relative to the axis of the cable being cut, the spiral cut is formed. The cutting by the second blade portion 34 is done without disengaging the bi-directional cutting blade 22 from the cable. Once the desired length of jacket is cut, the cable stripping tool 120 is again rotated in the first direction which causes the first blade portion 32 to perform the cutting and translate circumferentially around the cable to form the circumferential or ring cut as the cutting portion 36b cuts the cable jacket. This cutting by the first blade portion 32 is done without disengaging the bi-directional cutting blade 22 from the cable. The cable stripping tool 120 can then be pulled along the length of the cable to remove the cut section of the outer jacket from the remainder of the cable.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. A cable stripping tool configured to strip insulation from a cable, the cable stripping tool comprising:
a housing;
a cutting blade comprising a shaft, the shaft mounted in the housing, a cutting profile provided on the shaft and extending from the housing, and a centerline which extends along the cutting blade from a first end of the shaft to a second end of the cutting profile,
the cutting profile comprising a first blade portion and a second blade portion which are integrally formed,
the first blade portion having a width and comprising a first piercing and cutting edge and leading and trailing surfaces extending from the first piercing and cutting edge, wherein a first axis is defined by the first blade portion through the first piercing and cutting edge, along the width of the first blade portion and passing through the centerline, the first piercing and cutting edge forming a circumferential cut in the cable when the housing and the cutting blade are rotated in a first direction around the cable,
the second blade portion having a width and comprising a second piercing and cutting edge and leading and trailing surfaces extending from the second piercing and cutting edge, wherein a second axis is defined by the second blade portion through the second piercing and cutting edge of the second blade portion, along the width of the second blade portion and passing through the centerline, the second axis is angled relative to the first axis at an angle of less than 90 degrees and greater than 0 degrees, and the second piercing and cutting edge forming a spiral cut in the cable when the housing and the cutting blade are rotated in a second direction around the cable opposite to that of the first direction, and
wherein the cutting blade is locked in a locked configuration to the housing when the circumferential cut and the spiral cut are made, wherein the centerline of the cutting blade is in line with and does not rotate relative to the housing when the cutting blade is in the locked configuration, and wherein the cutting blade remains in the locked configuration and in constant engagement with the cable when making a transition between the circumferential cut and the spiral cut.

2. The cable stripping tool of claim 1, further comprising a compression spring contained within the stripping tool, the spring bearing in a rearward direction against an attachment arm extending inwardly from a longitudinally extending elongated section of a hooked end, the hooked end being configured to hold an associated cable and bias the associated cable toward the cutting blade.

3. The cable stripping tool of claim 1, wherein the angle at which the second axis is angled relative to the first axis is 60 degrees or less and greater than 0 degrees.

4. The cable stripping tool of claim 1, wherein the angle at which the second axis is angled relative to the first axis is 45 degrees or less and greater than 0 degrees.

5. The cable stripping tool of claim 1, wherein the leading surface of the first blade portion is radiused and defined by a first radius, and the leading surface of the second blade portion is radiused and defined by a second radius.

6. The cable stripping tool of claim 5, wherein the radii of the leading surfaces are tangential to lines of action defined by imaginary lines which each extend at an angle relative to the first axis.

7. The cable stripping tool of claim 5, wherein the radii of the leading surfaces are tangential to lines of action defined by imaginary lines which each extend at an angle substantially equal to or less than 45 degrees relative to the first axis.

8. The cable stripping tool of claim 5, wherein the trailing surface of the first blade portion is radiused and defined by a third radius, and the trailing surface of the second blade portion is radiused and defined by a fourth radius.

9. The cable stripping tool of claim 8, wherein the leading and trailing surfaces of the first blade portion are tangential to lines of action defined by imaginary lines which each extend at an angle relative to the first axis, and the leading and trailing surfaces of the second blade portion are tangential to lines of action defined by imaginary lines which each extend at an angle relative to the second axis.

10. The cable stripping tool of claim 8, wherein the leading and trailing surfaces of the first blade portion are tangential to lines of action defined by imaginary lines which each extend at an angle substantially equal to or less than 45 degrees relative to the first axis, and the leading and trailing surfaces of the second blade portion are tangential to lines of action defined by imaginary lines which each extend at an angle substantially equal to or less than 45 degrees relative to the second axis.

11. The cable stripping tool of claim 5, wherein the radii of the leading surfaces are the same.

12. The cable stripping tool of claim 5, wherein the radii of the leading surfaces are different.

13. The cable stripping tool of claim 5, further comprising a transition leading surface between the leading surface of the first blade portion and the leading surface of the second blade portion, the transition leading surface having a different radius than the radii of the leading surfaces.

14. The cable stripping tool of claim 1, wherein the leading surface of the first blade portion is planar and is angled relative to the first axis by a first angle, and the leading surface of the second blade portion is planar and is angled relative to the second axis by a second angle.

15. The cable stripping tool of claim 14, wherein each of the first angle and the second angle is substantially equal to or less than 45 degrees.

16. The cable stripping tool of claim 14, wherein the first and second angles of the leading surfaces are the same.

17. The cable stripping tool of claim 14, wherein the first and second angles of the leading surfaces are different.

18. The cable stripping tool of claim 14, wherein the trailing surface of the first blade portion is planar and is angled relative to the first axis by a third angle, and the trailing surface of the second blade portion is planar and is angled relative to the second axis by a fourth angle.

19. The cable stripping tool of claim 1, wherein the leading surfaces are convex.

20. The cable stripping tool of claim 1, wherein:
the first piercing and cutting edge has a curved piercing portion which curves relative to the centerline and a generally linear cutting portion which extends parallel to or generally parallel to the centerline, the curved piercing portion and the generally linear cutting portion are continuous and coplanar with each other; and
the second piercing and cutting edge has a curved piercing portion which curves relative to the centerline and a generally linear cutting portion which extends parallel to or generally parallel to the centerline, the curved piercing portion of the second piercing and cutting edge and the generally linear cutting portion of the second piercing and cutting edge are continuous and coplanar with each other.

\* \* \* \* \*